United States Patent [19]

Vorobiev et al.

[11] 4,166,100

[45] Aug. 28, 1979

[54] METHOD OF PREPARING GRANULATED ACTIVATED ALUMINA

[76] Inventors: Jury K. Vorobiev, ulitsa Tereshkovoi, 4, kv. 47; Boris N. Badaev, ulitsa Rossiiskaya, 26, kv. 19; Galina I. Ljubushko, bulvar Molodezhi, 7, kv. 1; Emmanuil A. Levitsky, ulitsa Tereshkovoi, 6, kv. 68; Georgy K. Boreskov, ulitsa Zolotodolinskaya, 85; Mikhail M. Andrushkevich, ulitsa Tereshkovoi, 6, kv. 157, all of Novosibirsk; Bronislav A. Baum, ulitsa Griboedova, 8, Berdsk Novosibirskoi oblasti; Nikolai A. Pakhomov, ulitsa Ilicha, 15, kv. 73; Ljudmila G. Khomyakova, ulitsa Arbuzova, 1, kv. 13, both of Novosibirsk; Alexandr E. Khramov, ulitsa Kultury, 12, kv. 61; Nina A. Rodionova, ulitsa Nemirovicha-Danchenko, 27, kv. 1, both of Gorky; Boris N. Isaev, ulitsa Tatarskaya, 7/2, kv. 12; Vladimir M. Knyazev, ulitsa, Stroikova, 69, korpus 1, kv. 31, both of Ryazan; Ella M. Moroz, ulitsa Tereshkovoi, 6, kv. 68, Novosibirsk; Vladimir N. Erofeev, ulitsa Gagarina, 83, kv. 53; Ivan P. Druzhinin, ulitsa Ostrovskogo, 34, kv. 10, both of Ryazan; Rimma A. Shkrabina, ulitsa Akademicheskaya, 21, kv. 38, Novosibirsk, all of U.S.S.R.

[21] Appl. No.: 909,977

[22] Filed: May 26, 1978

[51] Int. Cl.$^2$ .............................................. C01F 7/02
[52] U.S. Cl. ..................................... 423/626; 423/628; 423/630; 423/631; 252/463
[58] Field of Search ............... 423/625, 628, 626, 630, 423/631

[56] References Cited

U.S. PATENT DOCUMENTS

| | | | |
|---|---|---|---|
| 2,809,170 | 10/1957 | Cornelius et al. | 423/631 |
| 3,152,092 | 10/1964 | Cornelius | 423/628 |
| 3,222,129 | 12/1965 | Osment et al. | 423/628 |
| 3,223,483 | 12/1965 | Osment | 423/628 |
| 3,226,191 | 12/1965 | Osment et al. | 423/628 |
| 3,275,405 | 9/1966 | Clark | 423/625 |
| 3,701,718 | 10/1972 | Papee et al. | 423/625 |
| 4,117,105 | 9/1978 | Hertzenberg et al. | 423/628 |
| 4,120,942 | 10/1978 | Spitzer et al. | 423/631 |
| 4,124,699 | 11/1978 | Michel et al. | 423/625 |

FOREIGN PATENT DOCUMENTS

1361402  7/1974  United Kingdom ............ 423/DIG. 16

*Primary Examiner*—Herbert T. Carter
*Attorney, Agent, or Firm*—J. Harold Nissen

[57] ABSTRACT

The method of preparing granulated activated alumina consists in that alumina trihydrate is decomposed by bringing it in contact with a bed of a solid heat carrier having the temperature of 350° to 600° C., the contact time being from 0.05 to 0.5 second, to obtain a product of decomposition in the form of amorphous aluminium hydroxide. Said decomposition product is mixed with water into a suspension having the concentration of 100–500 g/liter, calculating with reference to aluminium oxide, and hydrated at a temperature of 20°–100° C. and the pH of 5 to 12 for 0.5 to 10 hours. The hydrated decomposition product is then treated with an acid, that can form water-soluble basic salts of aluminium, at a temperature of 20° to 150° C., granulated, dried at a temperature of 20° to 150° C., and calcined at a temperature of 400° to 600° C.

The granulated activated alumina can be used as an adsorbing material, as a catalyst, or a support for active components in chemical and petrochemical industry.

6 Claims, No Drawings

METHOD OF PREPARING GRANULATED ACTIVATED ALUMINA

This invention relates to the method of preparing aluminium oxide, and more particularly it relates to the method of preparing granulated activated alumina used as an adsorbing material, a catalyst, or a support for active components in chemical and petrochemical industries.

Known in the art is a method of preparing granulated activated alumina by processing dispersed precipitates of aluminium hydroxide (shaping, calcining) that are obtained in reprecipitation of crystalline aluminium hydroxide (hydrargillite).

Re-precipitation of hydrargillite is effected by dissolving it in an alkali or acid with subsequent treatment with an acid or alkali, respectively.

The disadvantage of this method is the great consumption of acids or alkalis, as a result of which considerable quantities of admixtures are formed that hinder the process of washing of the dispersed precipitate. The washing process requires much water, which in turn results in ample quantities of effluents that require utilization.

Moreover, known in the art is another method for preparing granulated activated alumina by decomposing alumina trihydrate by passing it through a gas having the temperature from 700° to 760° C. to obtain intermediate or amorphous alumina containing not less than 95 percent by weight of $\chi-\rho-Al_2O_3$. The loss on ignition is 5 to 10 percent by weight. The product of decomposition is then mixed with water and shaped into granules of the required size.

The obtained granules are placed in water having the temperature of 60° to 100° C. Part of $\chi-\rho-Al_2O_3$ is converted into aluminium hydroxide and the shaped granules are strengthened by the action of this hydroxide.

After hydration, the granules have the following composition, in percent by weight:

| | |
|---|---|
| Pseudo-Boehmite | 42–27 |
| Bayerite | 7–2 |
| $\chi$-$\rho$- $Al_2O_3$ | to make 100 |

The granules are then dried and calcined at a temperature of 200° to 450° C.

The product obtained by this method is characterized by the total capacity of the pores of 0.42 cc/g, specific surface area of 365 sq.m./g, and the prevalent pore radius of 48 Å.

The disadvantage of this method resides in complexity of the process equipment, in which damp powder of intermediate alumina (the product of decomposition of aluminatrihydrate) is shaped into granules. Moreover, hydration of the granulated product of decomposition of alumina trihydrate makes it difficult to modify within a wide range the pore structure of the final product, activated alumina. The decomposition of alumina trihydrate to the formation of intermediate aluminium oxides requires much heat to split practically three molecules of water from alumina trihydrate.

The object of the invention is to simplify the process and the equipment for preparing activated alumina and to increase the yield of product characterized by better properties.

Said object is accomplished in the herein-proposed method of preparing granulated activated alumina, comprising decomposition of alumina trihydrate by heating, mixing of the obtained product of decomposition with water, its hydration, granulation, drying at a temperature of 20°–150° C., and calcining at a temperature of 400°–600° C., in which, according to the invention alumina trihydrate is decomposed by bringing it in contact with a bed of a solid heat carrier having the temperature of 350°–600° C., for a period of time from 0.05 to 0.5 second, to obtain an amorpous aluminium hydroxide, which is mixed with water into a suspension having the concentration of 100–500 g/liter (as $Al_2O_3$), with subsequent hydration of this product of decomposition at a temperature of 20°–100° C. and the pH of 5–12 for 0.5–10 hours; before granulation of the hydrated product of decomposition, it is treated with an acid, that can form water-soluble basic salts of aluminium, at a temperature of 20°–150° C.

Alumina trihydrate should preferably be decomposed in a fluidized bed of a solid heat carrier by bringing it in contact with the heat carrier bed for a period of time from 0.05 to 0.5 second.

In order to obtain the hydrated decomposition product containing not less than 50 percent by weight of pseudo-Boehmite, it is recommended to hydrate the decomposition product at a temperature of 20°–80° C. and the pH of 5–10 for 0.5–8 hours; for preparing the hydrated decomposition product containing not less than 80 percent by weight of Bayerite aluminium hydroxide, the hydration process should be conducted at a temperature of 90°–100° C. and pH of 10.5 to 11.0 for 8–10 hours; for preparing the hydrated decomposition product containing not less than 80 percent by weight of Nordstrandite aluminium hydroxide, the hydration process should be carried out at a temperature of 80°–90° C. and pH of 11 to 12 for 8 to 10 hours in a medium of a 5 percent solution of ethylenediamine for 8–10 hours respectively.

In order to obtain granulated activated alumina free from sodium admixtures, before the acid treatment, the hydrated product of decomposition is filtered, and washed with water to residual sodium content not exceeding 0.02 percent by weight (as $Na_2O$).

The proposed method of preparing granulated activated alumina consists in decomposition of alumina trihydrate by bringing it in contact with a solid bed of a heat carrier, having the temperature of 350°–600° C. for a period of time from 0.05 to 0.5 second. Metallic, or ceramic particles of any configuration can be used as the solid heat carrier material. The result of the decomposition of alumina trihydrate is an amorphous product by X-ray, having the loss on ignition of 10–16 percent by weight, which is amorphous aluminium hydroxide close to alumina monohydrate with respect to its composition. The expression 'loss on ignition' is the standard loss in weight of product heated at a temperature of 800° C. for two hours. The sedimentation analysis of the amorphous aluminium hydroxide, which is the product of decomposition of alumina trihydrate, and of the starting alumina trihydrate, has shown that the distribution of their particles with respect to the size is the same. This means, that the particles of the starting alumina trihydrate are not destroyed in the process of their decomposition, but they are only cracked to release two molecules of water. The specific surface area of the decomposition product increases and sometimes attains the value of 400 sq.m./g.

The obtained product of decomposition of alumina trihydrate is mixed with water to obtain a suspension having the concentration of 100–500 g/liter (as $Al_2O_3$) and hydrated. Depending on the conditions of the hydration (temperature and pH of the medium), amorphous aluminium hydroxide, which is a product of decomposition of alumina trihydrate, can be converted into various modifications of aluminium hydroxide, viz., into pseudo-Boehmite, Bayerite, Nordstrandite or mixtures thereof. To prepare pseudo-Boehmite, the decomposition product is hydrated in an aqueous medium at pH 5–10 and a temperature of 20°–80° C. It should be noted that as amorphous aluminium hydroxide, which is the product of decomposition of alumina trihydrate, is mixed with water and hydrated, the pH of the medium increases to 11 on account of sodium ions that are liberated into water from the particles of the decomposed product. To adjust the pH below 11, from 1 to 8 g of an acid per gram of alumina are added to the mixture of the decomposition product in water.

In the hydration of the product of decomposition of alumina trihydrate to Bayerite or Nordstrandite, the acid correction of the pH is not required. In these cases amorphous aluminium hydroxide is hydrated at a temperature of 90°–100° C. and the pH 10.5–11, for preparing Bayerite, and at a temperature of 80°–90° C. and the pH 11–12 (in 5 percent ethylenediamine) for preparing Nordstrandite.

To obtain activated alumina free from sodium, the hydrated product of decomposition of alumina trihydrate, before the acid treatment, should be filtered and washed with water. After filtration, before the wash, the residual content of sodium in the precipitate is 0.05–0.17 percent by weight (as $Na_2O$). To obtain higher purity, hydrated product of alumina trihydrate decomposition is washed with distilled water, 7–9 liters per kg of alumina in the precipitate.

Further, the hydrated products of decomposition of alumina trihydrate are processed with acid that can form water-soluble basic salts of aluminium, e.g. with nitric acid, to prepare plastic aluminium hydroxide that can be granulated by the known methods.

The granules are dried at a temperature of 20°–150° C. and calcined at a temperature of 400°–600° C. in a stream of dry air or inert gas, their consumption being at least 1000 hour$^{-1}$.

The resultant granulated activated alumina has the specific surface area of 200–400 sq.m./g., the total pore capacity of 0.45–0.90 cc/g, and various pore structures.

The advantages of the proposed method, compared with the known method of preparing granulated activated alumina, are as follows.

Carrying out the process of decomposition of alumina trihydrate by bringing it in contact with a fluidized bed of a solid heat carrier, intensifies the heat and mass exchange in the decomposition zone, which in turn makes it possible to decrease the temperature of decomposition with an appreciable reduction of the time during which the particles of alumina trihydrate are present in the high temperature zone.

It is not obligatory to carry out the process of decomposition of alumina trihydrate to the formation of transition alumina of the type $\chi$—$Al_2O_3$ and $\rho$—$Al_2O_3$, having the loss on ignition of 5–10 percent by weight. The proposed method can be used to obtain an amorphous (to X-rays) product having a loss on ignition of 10–16 percent by weight, i.e. an amorphous aluminium hydroxide which is, with respect to its composition, close, to alumina monohydrate. The properties of this product of decomposition are practially the same as those of alumina of the type $\chi$—$Al_2O_3$ and $\rho$—$Al_2O_3$. Decomposing alumina trihydrate by the proposed method makes it possible to preserve one molecule of water in the structure of the decomposition product. This considerably decreases the consumption of heat in the decomposition process, since the heat required to remove the last molecule of water, 35.5 kcal/mole, is practically the same as the total heat required to remove the first two molecules of water, 36.3 kcal/mole.

Moreover, changing the hydration conditions (temperature, pH of the medium, and duration) of the product of decomposition of alumina trihydrate in water in the form of a suspension having the concentration of 100–500 g/liter (as $Al_2O_3$) or changing the acid treatment conditions of the hydrated product of decomposition makes it possible to modify within a wide range the pore structure of the end product, granulated activated alumina.

The acid treatment of the hydrated products of decomposition makes it possible to obtain plastic hydroxides of aluminium that can be granulated by the known methods.

For a better understanding of the invention, the following examples of its practical embodiment are given by way of illustration.

EXAMPLE 1

A mixture consisting of alumina trihydrate, having particles not greater than 200$\mu$, and air, is passed through a reactor filled with a fluidized bed of a solid heat carrier in the form of 4 mm long cylindrical granules of aluminium having the diameter of 4 mm. The fluidized bed of the solid heat carrier has the temperature of 500° C. Its height in the stationary state is 60 mm. The mean time of contact of alumina trihydrate particles with the hot solid heat carrier is 0.1 sec. During this time alumina trihydrate is decomposed to amorphous aluminium hydroxide, having the specific surface area of 250 sq.m./g; the loss on ignition is 14 percent by weight. The X-ray analysis shows that the obtained decomposition product is amorphous.

Now 1 kg of the obtained decomposition product is mixed with 3 liters of distilled water to prepare a suspension having the concentration of 215 g/liter (as $Al_2O_3$). In order to adjust the pH of the medium to 8, 4.3 g of nitric acid are added to the suspension. The product of decomposition is hydrated at a temperature of 70° C. for 6 hours with constant stirring. The resultant product is the hydrated decomposition product having the residual moisture content of 60 percent. The specific surface area of the hydrated product dried at a temperature of 110° C. is 240 sq.m./g. The X-ray analysis of the product shows that its composition is as follows: 70 percent by weight of pseudo-Boehmite, 30 percent by weight of Bayerite.

After hydration, the hydrated product of decomposition is filtered and washed with water to remove sodium admixtures. The water requirements are 7 liters per kg of $Al_2O_3$ in the precipitate. The residual sodium content in the precipitate is 0.02 percent by weight (as $Na_2O$).

2.1 kg of the hydrated product are mixed with 2.2 liters of distilled water to prepare a suspension having the concentration of 250 g/liter of ($Al_2O_3$) and treated with nitric acid taken in quantity of 0.15 mole per mole of $Al_2O_3$. The acid treatment is carried out at a temperature of 130° C. for four hours with constant stirring to prepare a plastic mass of aluminium hydroxide that does not delaminate.

The obtained mass is granulated into spheres, that are dried at a temperature of 105° C. and calcined in a furnace at a temperature of 550° C. for four hours, and air consumption of 1000 hour$^{-1}$.

The end product is granulated activated alumina in the form of spherical granules having the diameter of 2.5±0.5 mm, and characterized by the following properties: specific surface area 350 sq.m./g.; the total pore capacity, 0.71 cc/g.; the prevalent radius of pores, 60 Å; the compressive strength, 95 kg/sq.cm.

EXAMPLE 2

A mixture consisting of alumina trihydrate, having particles not greater than 200μ, and air, is passed through a reactor filled with a fluidized bed of a solid carrier in the form of ceramic balls, 2-3 mm in dia. The temperature of the fluidized bed is 350° C., its height (stationary) is 100 mm. The mean time of contact of the alumina trihydrate particles with the hot solid heat carrier is 0.2 second, during which alumina trihydrate is decomposed to an amorphous aluminium hydroxide having the specific surface area of 200 sq.m./g.; the loss on ignition, 16 percent by weight. The X-ray analysis shows that the product of decomposition is amorphous, with traces of residual alumina trihydrate.

Now 1 kg of the obtained product is mixed with 1.4 liter of distilled water to prepare a suspension having the concentration of 350 g/liter (as Al$_2$O$_3$). To adjust the pH of the medium to 9.5, 2.5 g of nitric acid are added to the suspension. The product is hydrated at a temperature of 80° C. for 5 hours with constant stirring. The obtained hydrated product has the residual moisture content of 48 percent by weight. The specific surface area of the hydrated product, dried at a temperature of 110° C., is 220 sq.m./g. The X-ray analysis shows the following composition: 60 percent by weight of pseudo-Boehmite and 40 percent by weight of Bayerite.

A suspension of the hydrated product having the concentration of 350 g/liter (Al$_2$O$_3$) is treated with hydrochloric acid taken in the quantity of 0.20 mole per mole of Al$_2$O$_3$. The acid treatment is effected at a temperature of 150° C. for six hours with constant stirring. The resultant plastic mass is shaped into cylindrical granules, dried at a temperature of 20° C. for 24 hours, and then at a temperature of 150° C. for an hour, and finally calcined in a furnace at a temperature of 400° C. for six hours in a stream of air.

The end product, is granulated activated alumina, in the form of 4-6 mm long cylindrical granules, 4 mm in diameter, having the following characteristics: the specific surface area, 300 sq.m./g.; the total volume of pores, 0.45 cc/g; the prevalent radius of pores, 50 Å; the compressive strength, 140 kg/sq.cm (pressure applied to the end).

EXAMPLE 3

A mixture consisting of alumina trihydrate, having particles not greater than 200μ, and air, is passed through a reactor filled with a fluidized bed of a solid heat carrier in the form of copper cylinders, 2 mm long and 2 mm in diameter. The fluidized bed temperature is 600° C. and its height (in the stationary state) is 40 mm. The mean contact time is 0.05 second, during which alumina trihydrate is decomposed to an amorphous (to X-rays) product having the specific surface area of 380 sq.m./g.; the loss on ignition, 15 percent by weight.

Now 1 kg of the product of decomposition of alumina trihydrate is mixed with 7.5 liters of distilled water to prepare a suspension having the concentration of 100 g/liter (as Al$_2$O$_3$). To adjust the pH of the medium to 10, 0.85 g of nitric acid is added to the suspension. The decomposition product is hydrated at a temperature of 50° C. for 8 hours with constant stirring, to obtain a hydrated product of decomposition having the residual moisture content of 55 percent by weight. The specific area of the product, dried at a temperature of 110° C., is 300 sq.m./g. The X-ray analysis shows the following composition of the product: 60 percent by weight of pseudo-Boehmite and 40 percent by weight of Bayerite.

The suspension of the hydrated product of decomposition, having the concentration of 100 g/liter (Al$_2$O$_3$) is treated with nitric acid taken in the quantity of 0.1 mole per mole of Al$_2$O$_3$. The acid treatment is effected at a temperature of 110° C. for 6 hours with constant stirring. The obtained mass of aluminium hydroxide is shaped into granules ('fine sphere'), dried at a temperature of 100° C. and calcined at a temperature of 400° C. for 4 hours in a stream of air.

The obtained granulated activated alumina is spherical granules, from 0.1 to 2 mm in diameter, characterized by the following properties: specific surface area, 380 sq.m./g.; total pore capacity, 0.65 cc/g.; prevalent radius of pore, 150 Å and 1000 Å.

EXAMPLE 4

A mixture consisting of alumina trihydrate, having particles not greater than 200μ and air, is passed through a reactor filled with a fluidized bed of a heat carrier, which is bed of regularly placed rings having the inner diameter of 1 mm and the outer diameter of 3 mm. The bed of the solid heat carrier has the temperature of 450° C. and the height of 300 mm. The time during which the particles of alumina trihydrate are in contact with the hot bed of the heat carrier is 0.5 sec, during which alumina trihydrate is decomposed to an amorphous (to X-ray) product having the specific surface area of 400 sq.m./g.; the loss on ignition, 10 percent by weight.

Now 1 kg of the product of decomposition is mixed with 0.8 liter of distilled water to obtain a suspension having the concentration of 500 g/liter (as Al$_2$O$_3$). To adjust the pH of the medium to 8, 4.5 g of nitric acid are added to the suspension. The hydration is carried out at a temperature of 60° C. for 8 hours with constant stirring. The residual moisture content of thus obtained product is 43 percent by weight. The specific surface area of the hydrated product, dried at a temperature of 110° C., is 230 sq.m./g. The composition of the product, as revealed by the X-ray analysis, is as this: 80 percent by weight of pseudo-Boehmite, 20 percent by weight of Bayerite.

After the hydration, the suspension is filtered, and the precipitate washed to remove sodium admixtures. The consumption of water is 7 liters per kg of Al$_2$O$_3$ in the precipitate. The residual sodium content is 0.015 percent by weight (as Na$_2$O).

1.6 kg of the washed precipitate are mixed with 2 liters of distilled water to prepare a suspension, having the concentration of 350 g/liter (as Al$_2$O$_3$), and treated with acid as in Example 2. The obtained mass of aluminium hydroxide is shaped into ring-shaped granules, dried at a temperature of 100° C. and calcined at a temperature of 550° C. for 4 hours, in a stream of air, delivered at a rate of 1000 hour$^{-1}$.

The obtained granulated activated alumina, is ring-shaped granules, having the inner diameter of 2 mm and the outer diameter of 4 mm., and 4–8 mm long. The properties of the product are as follows: specific surface area, 270 sq.m./g.; total capacity of pores, 0.5 cc/g.; the prevalent radius of pores, 100 Å; compressive strength, 40 kg/sq.cm.

EXAMPLE 5

A plastic mass of aluminium hydroxide prepared by a procedure described in Example 3, after acid treatment, is shaped into microspherical granules, dried at a temperature of 100° C., and calcined at a temperature of 400° C. for 4 hours in a current of air.

The obtained granulated activated alumina is spherical granules, 20–100μ, in diameter, characterized by the following properties: specific surface area, 330 sq.m./g.; total capacity of pores, 0.6 cc/g.; prevalent pore radius, 100 Å and 700–1000 Å.

EXAMPLE 6

A suspension of hydrated product of decomposition, obtained as described in Example 2, is treated with nitric acid taken in the quantity of 0.05 mole per mole of $Al_2O_3$. The acid treatment is effected at a temperature of 70° C. for three hours with constant stirring. The obtained mass of aluminium hydroxide is shaped into 3–5 mm long cylindrical granules, 1 mm in diameter, dired at a temperature of 100° C., and calcined at a temperature of 500° C. for 5 hours in a stream of air, delivered at a rate of 1000 hour$^{-1}$.

The obtained granulated activated alumina has the following characteristics: specific surface area, 300 sq.m./g.; total pore capacity, 0.55 cc/g; prevalent pore radius, 50 Å, 1000 Å, and 10,000 Å; compressive strength (pressure applied to the granule end), 90 kg/sq.cm.

EXAMPLE 7

2.1 kg of washed hydrated product of decomposition, obtained as described in Example 1, are mixed with 0.3 liter of distilled water and treated with nitric acid taken in the quantity of 0.08 mole per mole of $Al_2O_3$. The acid treatment is effected at a temperature of 20° C. for 3.5 hours with constant stirring. The obtained plastic mass is shaped into 6–10 mm long cylinders having the diameter of 5 mm, dried at a temperature of 100° C., and calcined at a temperature of 550° C. for 5 hours in a stream of air, delivered at a rate of 1000 hour$^{-1}$.

The obtained granulated activated alumina has the following characteristics: specific surface area, 350 sq.m./g.; the total pore capacity, 0.75 cc/g.; prevalent pore radius, 100 Å and 10,000 Å; the compressive strength (pressure applied to the cylinder end) 80 kg/sq. cm.

EXAMPLE 8

2.1 kg of washed hydrated product of decomposition, obtained as described in Example 1, are mixed with 0.9 liter of distilled water and treated with nitric acid taken in the quantity of 0.02 mole per mole of $Al_2O_3$. The acid treatment is effected at a temperature of 90° C. for an hour with constant stirring. The obtained plastic mass is shaped into 4–8 mm-long cylinders, having the diameter of 3 mm. The cylinders are dried at a temperature of 100° C. and calcined at a temperature of 550° C. for 5 hours in a stream of air delivered at a rate of 1000 hour$^{-1}$.

The obtained activated granulated alumina has the following characteristics: the specific surface area, 340 sq.m./g.; the total pore capacity, 0.5 cc/g.; the prevalent pore radius, 50 Å and 500 Å; the compressive strength (pressure applied to the end of the cylinder), 180 kg/sq.cm.

EXAMPLE 9

1 kg of the product of decomposition of alumina trihydrate obtained as described in Example 1, is mixed with 7.6 liters of distilled water, and hydrated at a temperature of 90° C. for 10 hours with constant stirring. The pH of the medium is 11 which is due to liberation of sodium ions from the products of decomposition. The residual moisture content of thus obtained product is 45 percent by weight. The specific surface area of the hydrated product dried at a temperature of 110° C. is 60 sq.m/g. The X-ray analysis proves the following composition: 90 percent by weight of Bayerite, and 10 percent by weight of pseudo-Boehmite.

The hydrated product is filtered and washed to remove sodium admixtures. The consumption of washing water is 9 liters per kg of $Al_2O_3$ in the precipitate. The residual sodium content of the precipitate is 0.02 percent by weight (as $Na_2O$).

1.6 kg of the washed hydrated product of decomposition are mixed with 1.4 liters of distilled water and treated with nitric acid taken in the quantity of 0.05 mole per mole of $Al_2O_3$. The acid treatment is carried out at a temperature of 90° C. for 4 hours with constant stirring. The obtained plastic mass of aluminium hydroxide is shaped into 4–5 mm-long cylinders having the diameter of 5μ, dried at a temperature of 100° C., and calcined at a temperature of 450° C. for 5 hours in a stream of air delivered at a rate of 1000 hour$^{-1}$.

The obtained granulated activated alumina has the following characteristics: the specific surface area, 380 sq.m/g.; the total pore capacity, 0.90 cc/g.; the prevalent pore redius, 40 and 300 Å; the compressive strength, (pressure applied to the cylinder end), 50 kg/sq.cm.

EXAMPLE 10

1 kg of a product of decomposition of alumina trihydrate, obtained as described in Example 3, is mixed with 7.5 liters of distilled water and hydrated at a temperature of 90° C. for 8 hours with constant stirring. The pH of the medium, at which the decomposition product is hydrated, is 11 due to sodium ions liberated into water from particles of the decomposed product. The residual moisture content of thus obtained product is 50 percent by weight. The specific surface area of the hydrated product, dried at a temperature of 110° C., is 80 sq.m./g. The X-ray analysis proves the following composition: 80 percent by weight of Bayerite, and 20 percent by weight of pseudo-Boehmite.

The further treatment of the hydrated product of decomposition (filtration, washing, acid treatment, granulation, drying, and calcining) is effected as described in

EXAMPLE 9

The end product is granulated activated alumina, which is 4–5 mm-long cylinders having the diameter of 3 mm, and characterized by the following properties: the surface area, 350 sq.m.g.; the total pore capacity, 0.85 cc/g.; the prevalent pore radius, 40 and 300 Å; the compressive strength (pressure applied to the cylinder end), 60 kg/sq.cm.

EXAMPLE 11

1 kg of the product of decomposition of alumina trihydrate, obtained as described in Example 4, is mixed with 8 liters of distilled water and hydrated at a temperature of 100° C. for ten hours with constant stirring. The pH 10.5 accounts for the libration in water of sodium ions from the products of decomposition. The residual moisture content of the hydrated product is 40 percent by weight. The specific surface area of the hydrated product, dried at a temperature of 110° C., is 90 sq.m./g.

The X-ray analysis proves the following composition: 70 percent by weight of Bayerite, 20 percent by weight of Nordstrandite, and 10 percent by weight of pseudo-Boehmite.

The hydrated product of decomposition is washed to remove sodium as described in Example 9.

1.5 kg of the washed hydrated product of decomposition of alumina trihydrate is mixed with 1.2 liters of distilled water and treated with nitric acid taken in the quantity of 0.1 mole per mole of $Al_2O_3$. The acid treatment is effected at a temperature of 110° C. for 6 hours with constant stirring. The further processing of the acid-treated plastic mass is effected as described in Example 9.

The resultant granulated activated alumina has the following characteristics: the specific surface area, 390 sq.m/g; the total pore capacity, 0.8 cc/g.; the prevalent pore radii 50 and 10,000 Å; the compressive strength pressure applied to the end, 50 kg/sq.cm.

EXAMPLE 12

1 kg of the product of decomposition of alumina trihydrate, obtained by a procedure described in Example 3, is mixed with 7.5 liters of 5% aqueous solution of ethylenediamine. The pH of the medium is 12. The hydration is carried out at a temperature of 90° C. for 8 hours with constant stirring. The residual moisture content of the obtained hydrated product is 45 percent by weight. The specific surface area of the hydrated product, dried at a temperature of 110° C., is 60 sq.m./g. The X-ray analysis proves the following composition: 90 percent by weight of Nordstrandite and 10 percent by weight of pseudo-Boehmite.

The further treatment of the obtained hydrated product of decomposition of alumina trihydrate is effected as described in Example 9. The obtained granulated activated alumina has the following characteristics: the specific surface area, 350 sq.m./g.; the total pore capacity, 0.75 cc/g.; the prevalent pore radii, 50 and 5,000 Å; the compressive strength, (pressure applied to the end), 60 kg/sq.cm.

EXAMPLE 13

Granulated activated alumina is prepared by a procedure similar to that described in Example 12 except that the hydration process is carried out at a temperature of 80° C. for 10 hours with constant stirring. The residual moisture content of the hydrated product is 50 percent by weight; its specific surface area is 80 sq.m.g.; the composition is 80 percent by weight of Nordstrandite and 20 percent by weight of pseudo-Boehmite.

EXAMPLE 14

A mixture consisting of alumina trihydrate, having particles not larger than 200 μ, and air, is passed through a reactor filled with a fluidized bed of a solid heat carrier, which comprises ring-shaped granules having the inner diameter of 2 mm and the outer diameter of 4 mm. The bed of the solid heat carrier has the temperature of 550° C. and the height of 200 mm. The time during which the alumina trihydrate particles are present in the bed of the hot heat carrier is 0.35 sec.; during this time alumina trihydrate is decomposed to an amorphous (to X-ray analysis) product. Its specific surface area is 300 sq.m./g., the loss on ignition is 12 percent by weight.

1 kg of the product of decomposition of alumina trihydrate is mixed with 7.8 liters of distilled water to prepare a suspension having the concentration of 100 g/liter (as $Al_2O_3$). To adjust the pH to 5, 7 g of nitric acid are added to the suspension. The hydration of the product of decomposition is effected at a temperature of 20° C. for 8 hours with constant stirring. The residual moisture content of the hydrated product is 55 percent by weight. The specific surface area of the hydrated product, dried at a temperature of 110° C., is 210 sq.m/g. The X-ray analysis proves the following composition: 70 percent by weight of pseudo-Boehmite and 30 percent by weight of Bayerite.

The further treatment of the hydrated product and the properties of the end product are the same as in Example 35.

EXAMPLE 15

A mixture consisting of alumina trihydrate, having particles not exceeding 200μ in size, and air, is passed through a reactor filled with a fluidized bed of a solid heat carrier in the form of 3-mm long cylinders of aluminium having the diameter of 2 mm. The fluidized bed of the heat carrier has the temperature of 450° C.; its (stationary) height is 50 mm. The mean time during which the alumina trihydrate particles are brought in contact with the hot heat carrier is 0.08 second. During this time alumina trihydrate is decomposed to an amorphous aluminium hydroxide having the specific surface area of 210 sq.m./g.; its loss on ignition is 16 percent by weight.

1 kg of the amorphous aluminium hydroxide, which is the product of decomposition of alumina trihydrate, is mixed with 2 liters of distilled water and 5 g of nitric acid. The hydration is carried out at a temperature of 80° C. and the pH 7 for 6 hours with constant stirring. The residual moisture content of the hydrated product is 62 percent by weight. The X-ray analysis proves the following composition of the resultant product: 75 percent by weight of pseudo-Boehmite, 25 percent by weight of Bayerite.

The further treatment of the hydrated product of decomposition of alumina trihydrate is carried out as described in Example 1. The end product, activated alumina, is spherical granules having the diameter of 2.5±0.5 mm, characterized by the following properties: the specific surface area 300 sq.m./g.; the total pore capacity, 0.65 cc/g.; the prevalent pore radii, 100 and 1000 Å; the compressive strength, 70 kg/sq.cm.

EXAMPLE 16

1 kg of the decomposition product obtained as described in Example 1 is mixed with 2.5 l of distilled water. The result is a suspension having a concentration of 240 g/l (for $Al_2O_3$). For establishing the pH of the medium equal to 5.8, 6.5 g of nitric acid are introduced into the suspension. Hydration of the decomposition product is carried out at a temperature of 0.5 hr. under continuous intensive stirring. The residual moisture content of the hydrated product is 60 percent. The specific surface area of the hydrated decomposition product dried at 110° C. is 320 sq.m/g. X-ray analysis proves the following composition of the resultant product: 70 percent by weight of pseudo-Boehmite and 30 percent by weight of amorphous aluminium hydroxide (product of decomposition of alumina trihydrate).

After the hydration the hydrated product of decomposition is filtered and washed to remove sodium, the water consumption for washing being 7.5 l per kg of $Al_2O_3$ in the precipitate, the residual content of sodium in the precipitate ultimately being 0.02 percent by weight (for $Na_2O$).

2.1 kg of the hydrated product of decomposition are mixed with 2.1 of distilled water to prepare a suspension having a concentration of 260 g/l for $Al_2O_3$, and treated with nitric acid in an amount of 0.1 mole $HNO_3$ per mole $Al_2O_3$. The treatment is carried out at a temperature of 130° C. for 4 hours under constant stirring. The resulting product is a plastic mass of aluminium hydroxide.

This mass is then shaped into spherical granules, which are subjected to drying at a temperature of 100° C. and calcining at 500° C. for 4 hours, the air consumption being 1000 $hr^{-1}$. The end product, granulated activated alumina, comprises spherical granules having a diameter of 2.5±0.5 mm and the following characteristics: specific surface area 320 sq.m/g; total pore capacity, 0.55 cc/g; prevelant pore radius, 50 Å, compressive strength, 100 kg/sq.cm.

EXAMPLE 17

1 kg of the decomposition product prepared as described in Example 14 is mixed with 2.5 l of distilled water to prepare a suspension having a concentration of 250 g/l for $Al_2O_3$.

For adjusting the pH of the medium to be equal to 6, 6.3 g of nitric acid are introduced into the suspension. Hydration of the decomposition product is carried out at a temperature of 20° C. for 3 hours under constant stirring. The residual moisture content of the hydrated product is 55 percent. The specific surface area of the hydrated decomposition product dried at 110° C. is 370 sq.m./g. X-ray analysis proves the following composition of the resultant product: 60 percent by weight of pseudo-Boehmite and 40 percent by weight of amorphous aluminium hydroxide (decomposition product).

After the hydration the hydrated decomposition product is filtered and washed to remove sodium, the water consumption for washing being 7.5 l per kg of $Al_2O_3$ in the precipitate, the residual content of sodium in the precipitate ultimately being 0.02 percent by weight (for $Na_2O$).

1.96 kg of the hydrated decomposition product are mixed with 1.6 l of distilled water to prepare a suspension having a concentration of 280 g/l for $Al_2O_3$, and treated with nitric acid in an amount of 0.01 mole $HNO_3$ per mole $Al_2O_3$. The treatment is carried out at a temperature of 130° C. for 5 hours under constant stirring. The resulting product is a plastic mass of aluminium hydroxide.

This mass is shaped into spherical granules, which are then dried at a temperature of 100° C. and calcined at 550° C. for 4 hours, the air consumption being 1000 $hr^{-1}$.

The end product, granulated activated alumina, comprises spherical granules having a diameter of 2.5±0.5 mm and the following characteristics: specific surface area, 360 sq.m/g.; total pore capacity, 0.5 cc/g; prevelent pore radius, 40 Å; compressive strength, 120 kg/sq.cm.

We claim:

1. Method of preparing granulated activated alumina comprising the steps of:

decomposing alumina trihydrate by contacting it with a fluidized bed of a solid carrier having a temperature of from about 350° C. to about 600° C. for a contact time of from about 0.05 to about 0.5 seconds thereby to form a decomposition product composed of amorphous aluminum hydroxide;

mixing said decomposition product with water to form an aqueous suspension having a concentration of about 100 to 500 gram/liter calculated on the basis of aluminum oxide;

hydrating said decomposition product by adjusting said suspension of said decomposition product to a temperature of from about 20° C. to about 100° C. and a pH from about 5 to about 12 for about 0.5 to 10 hours;

treating the hydrated decomposition product with an acid that can form water soluble basic salts with aluminum at a temperature of about 20° C. to about 150° C.; thereafter granulating the acid treated decomposition product;

drying the granulated product at a temperature of from about 20° C. to about 150° C.; and calcinating the dryed granulated product at a temperature of about 400° C. to about 600° C.

2. A method according to claim 1 wherein, during said decomposing step the contact time is 0.05 to 0.2 second.

3. A method according to claim 1, in which said hydrating step is carried out at a temperature of 20°–80° C. and a pH of 5 to 10, for 0.5 to 8 hours, to obtain a hydrated product of decomposition containing not less than 50 percent by weight of pseudo-Boehmite.

4. A method according to claim 1, in which said hydrating step is carried out at a temperature of 90°–100° C. and a pH 10.5 to 11, L for 8 to 10 hours, to prepare a hydrated product of decomposition containing not less than 80 percent by weight of Bayerite.

5. A method according to claim 1, in which said hydrating step is carried out at a temperature of 80° to 90° C. and a pH of 11–12, in a medium of a 5 percent solution of ethylenediamine for 10 hours, to prepare a hydrated product of decomposition containing not less than 80 percent by weight of Nordstrandite.

6. A method according to claim 2, 3, 4 or 1, further including, before said step of treating the hydrated decomposition product with an acid, the steps of separating the hydrated product of decomposition from water and thereafter washing the separated product with water until the residual quantities of sodium in it do not exceed 0.02 percent by weight, calculating with reference to $Na_2O$.

* * * * *